Aug. 4, 1925.
C. SATTLER
1,548,755
COMBINATION TOOL
Filed March 8 1924
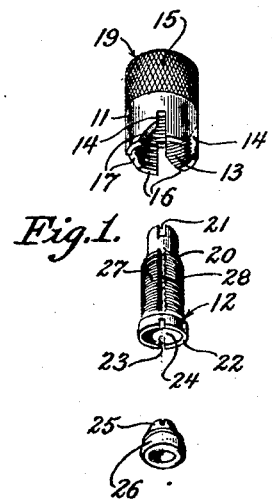
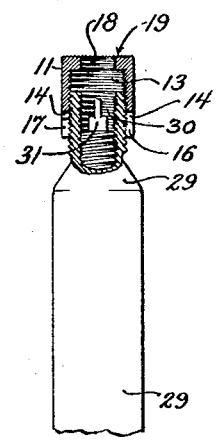
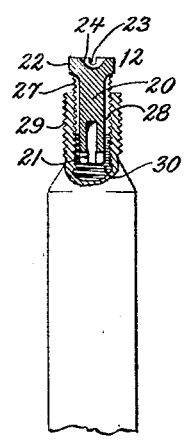
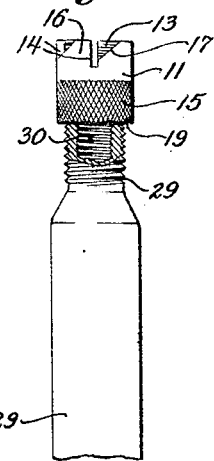
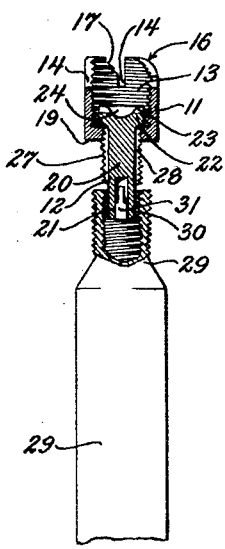
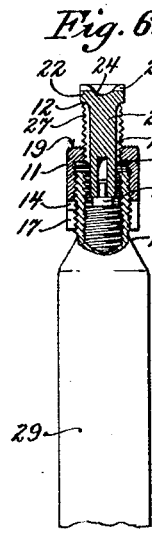
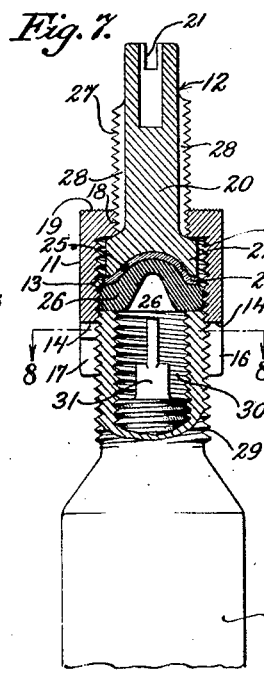
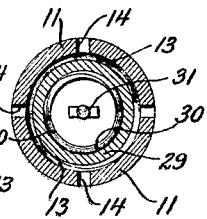
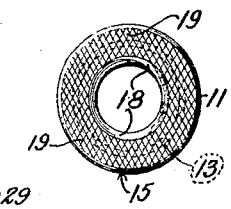
Charles Sattler
INVENTOR
BY Victor J. Evans
ATTORNEY
WITNESS:

Patented Aug. 4, 1925.

1,548,755

UNITED STATES PATENT OFFICE.

CHARLES SATTLER, OF BROOKLYN, NEW YORK.

COMBINATION TOOL.

Application filed March 8, 1924. Serial No. 697,799.

*To all whom it may concern:*

Be it known that I, CHARLES SATTLER, a citizen of the United States, residing at Brooklyn, in the county of Kings and State of New York, have invented new and useful Improvements in Combination Tools, of which the following is a specification.

This invention relates to a combination tool and valve cap for use in connection with pneumatic tire valves.

The principal object of the invention is the provision of a pair of co-acting parts which may be used as a die and tap for resharpening the exterior or interior threads of a valve casing should the same become worn, and when not used for this purpose, the parts may be assembled and applied to the end of the valve casing for sealing the same against leakage.

A further object of the invention is to provide a device which includes a means for removing the valve stem from the casing and a means for holding the valve stem in an open position to permit the air in a tire to be exhausted.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a perspective view of my invention showing the parts separated.

Figure 2 is a detail vertical sectional view through a portion of a tire valve showing the parts assembled and in use for cleaning the exterior threads of a valve casing.

Figure 3 is a similar view but showing the manner of rethreading or cleaning the interior thread of a valve casing.

Figure 4 is a similar view but showing the manner of reaming the top edge of the valve casing after the same has been rethreaded.

Figure 5 is a similar view showing the manner of removing the valve stem.

Figure 6 is a similar view but showing the manner of holding the valve stem unseated to permit the air in the tire to be exhausted.

Figure 7 is an enlarged vertical sectional view showing my invention in use as a valve cap.

Figure 8 is a horizontal sectional view on the line 8—8 of Figure 7.

Figure 9 is an end elevation of one of the parts.

Referring more particularly to the drawing, my invention in its entirety includes two co-acting parts 11 and 12. The part 11 is in the form of a cap, internally screw-threaded as at 13, and is slotted from the open end as at 14 to a point adjacent an external milled surface 15. The slots 14 divide the end of the part 11 into segments 16 and each segment is cut-away as at 17 to permit the part to be used for a purpose presently to be described. The top of the part 11 is formed with a threaded opening 18, and the exterior portion of the top is milled as at 19 for burnishing or reaming purposes.

The part 12 above referred to, comprises a shank 20 having a kerf 21 at one end, and a head 22 at its opposite end. The head 22 is of a diameter to fit within the open end of the part 11, and is also provided with a kerf 23. The head 22 has its under face concaved as at 24 to form a seat for a plate or disk 25 having a spherical head, and which plate carries a rubber gasket or washer 26. The shank 20 is externally screw threaded as at 27 for a portion of its length and the diameter is such as to permit the threads to co-act with the threaded opening 18 in the part 11 for performing the different operations to be presently described. The threads 27 are broken by vertical slots 28 to render the threaded surface capable of use as a tap for cutting threads on the interior walls of a valve casing.

In Figure 2, the part 11 is shown for use in cleaning or rethreading the end of a valve casing 29 wherein the segments 16 serve as a thread die, it being understood that the part 11 is placed over the end of the valve casing and given a turning movement.

The interior threads 30 in the top of the valve casing 29 often become worn by the constant removal of the valve stem 31, and in such case, the threads 27 of the part 12 are used to resharpen these threads as clearly shown in Figure 3 of the drawing.

It has been found that when rethreading the casing, a flange will appear on the top of the casing, and the milled surface 19 of the part 11 is used to remove this flange to provide a smooth surface. This operation is clearly shown in Figure 4.

When it is desired to remove the valve stem 31 from the casing 29, the part 12 is inserted in the open end of the casing to seat the top of the valve stem in the kerf 21, after which the turning movement is imparted by the fingers of the hand to unscrew the stem from the casing. Should it be desired to secure a stronger grip on the part 12 in order to remove the stem, the part 11 may be associated therewith as clearly shown in Figure 5. A screw driver may also be used to remove the stem by inserting the same in the kerf 23.

When it is desired to exhaust the tire of its contents, the part 11 is screwed down over the open end of the stem as shown in Figure 6 and the part 12 is screwed through the threaded opening into contact with the end of the valve stem thus depressing the valve against the tension of the spring usually employed for holding the same seated. The air from the casing 29 is permitted to pass out through the slots 14 in the part 11. In Figure 7 the parts are shown as assembled for sealing the open end of the valve casing. For this purpose the part 12 is connected with the part 11 by passing the shank 20 through the threaded opening 18 to bring the head 22 into the open end of the part 11, the threads 27 co-acting with the threads in the opening 18. The washer or gasket 26 is seated against the head 22 after which the part 11 is threaded to the exterior of the casing 29. The part 12 is then rotated or screwed down to bring the washer into sealing engagement with the top of the casing where it will seal the same and prevent leakage should any of the parts constituting the valve structure become worn.

From the foregoing description, it will be seen that there has been shown and described an article which may be used for numerous purposes, and which consists of a minimum number of parts, the same being ready for instant use for the repairs of pneumatic tire valves.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

A device of the class described comprising a pair of separable parts, means formed on one of said parts for threading the exterior of a valve stem, means on the other of said parts for threading the interior of a valve stem, and a threaded opening formed in said first part for co-action with said last means for holding said parts correlated when the device is applied to a valve stem for closing the open end of the same.

In testimony whereof I have affixed my signature.

CHARLES SATTLER.